US009451069B2

(12) United States Patent
Inukai et al.

(10) Patent No.: US 9,451,069 B2
(45) Date of Patent: Sep. 20, 2016

(54) MOBILE TERMINAL DEVICE, LOCK RELEASE METHOD, AND NON-TRANSITORY COMPUTER READABLE STORAGE MEDIUM

(71) Applicant: KYOCERA Corporation, Kyoto (JP)

(72) Inventors: Tsuneyasu Inukai, Yokohama (JP); Toshikazu Kawauchi, Yokohama (JP); Shinsuke Moriai, Osaka (JP); Toshiaki Nade, Yokohama (JP); Masahiro Narita, Higashishirakawa-gun (JP); Yasuhiro Miki, Ikoma (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/751,008

(22) Filed: Jun. 25, 2015

(65) Prior Publication Data

US 2015/0296066 A1    Oct. 15, 2015

Related U.S. Application Data

(63) Continuation of application No. PCT/JP2013/084531, filed on Dec. 24, 2013.

(30) Foreign Application Priority Data

Dec. 25, 2012    (JP) .................................. 2012-281786

(51) Int. Cl.
*H04M 1/673*    (2006.01)
*G06F 3/0481*    (2013.01)
(Continued)

(52) U.S. Cl.
CPC ............ *H04M 1/673* (2013.01); *G06F 1/1626* (2013.01); *G06F 1/1692* (2013.01); *G06F 3/03547* (2013.01); *G06F 21/36* (2013.01); *H04M 1/67* (2013.01); *H04M 2250/22* (2013.01)

(58) Field of Classification Search
CPC ............... H04M 1/64; H04M 1/0206; H04M 2250/12; H04M 1/02; H04M 1/673; H04M 1/66; H04M 2250/22; H04M 1/67; H04W 88/02; H04W 8/22; G06F 1/1626; G06F 3/0488; G06F 1/1692; G06F 2203/04104; G06F 3/03547
USPC ............... 455/410, 566, 557, 558, 569, 575, 455/575.1; 715/761; 345/173
See application file for complete search history.

(56) References Cited

U.S. PATENT DOCUMENTS

2007/0150842 A1    6/2007  Chaudhri et al.
2009/0135555 A1*   5/2009  Komine .............. H04M 1/0237
                                              361/679.26

(Continued)

FOREIGN PATENT DOCUMENTS

JP    2007-116602    *  5/2007  ............ H04M 1/667
JP    2007-116602 A     5/2007

(Continued)

OTHER PUBLICATIONS

International Search Report dated Apr. 1, 2014, issued for International Application No. PCT/JP2013/084531.

(Continued)

*Primary Examiner* — Inder Mehra
(74) *Attorney, Agent, or Firm* — Procopio Cory Hargreaves and Savitch LLP

(57) ABSTRACT

A mobile terminal device and methods are disclosed. A display module is provided on a first surface of the casing. A first detection module is provided to cover the display module and detects a user's operation. A second detection module is provided on a second surface opposed to the first surface and detects a user's operation. A lock control module sets a lock function for preventing the user's wrong operation. The lock control module releases the setting of the lock function, if the lock function is set and if the first detection module has detected a first operation. The lock control module releases the setting of the lock function, if the lock function is set and if the second detection module has detected a second operation.

9 Claims, 13 Drawing Sheets

(51) Int. Cl.

| | | |
|---|---|---|
| G06F 3/0482 | (2013.01) | |
| G06F 3/0488 | (2013.01) | |
| G06F 1/16 | (2006.01) | |
| G06F 3/0354 | (2013.01) | |
| G06F 21/36 | (2013.01) | |
| H04M 1/67 | (2006.01) | |

(56) References Cited

U.S. PATENT DOCUMENTS

| | | |
|---|---|---|
| 2009/0241072 A1 | 9/2009 | Chaudhri et al. |
| 2011/0296356 A1 | 12/2011 | Chaudhri et al. |
| 2012/0023458 A1 | 1/2012 | Chaudhri et al. |
| 2012/0056829 A1 | 3/2012 | Kasahara et al. |
| 2012/0249459 A1 | 10/2012 | Sashida et al. |
| 2012/0293438 A1 | 11/2012 | Chaudhri et al. |
| 2013/0185677 A1 | 7/2013 | Chaudhri et al. |
| 2013/0185678 A1 | 7/2013 | Chaudhri et al. |
| 2013/0185680 A1 | 7/2013 | Chaudhri et al. |
| 2013/0190056 A1 | 7/2013 | Chaudhri et al. |
| 2014/0221050 A1* | 8/2014 | Kato .................... G06F 1/1626 455/566 |
| 2015/0082252 A1 | 3/2015 | Chaudhri et al. |

FOREIGN PATENT DOCUMENTS

| | | | | |
|---|---|---|---|---|
| JP | 2011-123755 A | * | 6/2011 | ............. G06F 12/14 |
| JP | 2012-058881 | * | 3/2012 | ............. G06F 3/048 |
| JP | 2012-181847 | * | 9/2012 | ............... G06F 3/41 |

OTHER PUBLICATIONS

Written Opinion of the International Searching Authority issued by Japan Patent Office for International Application No. PCT/JP2013/084531.

* cited by examiner

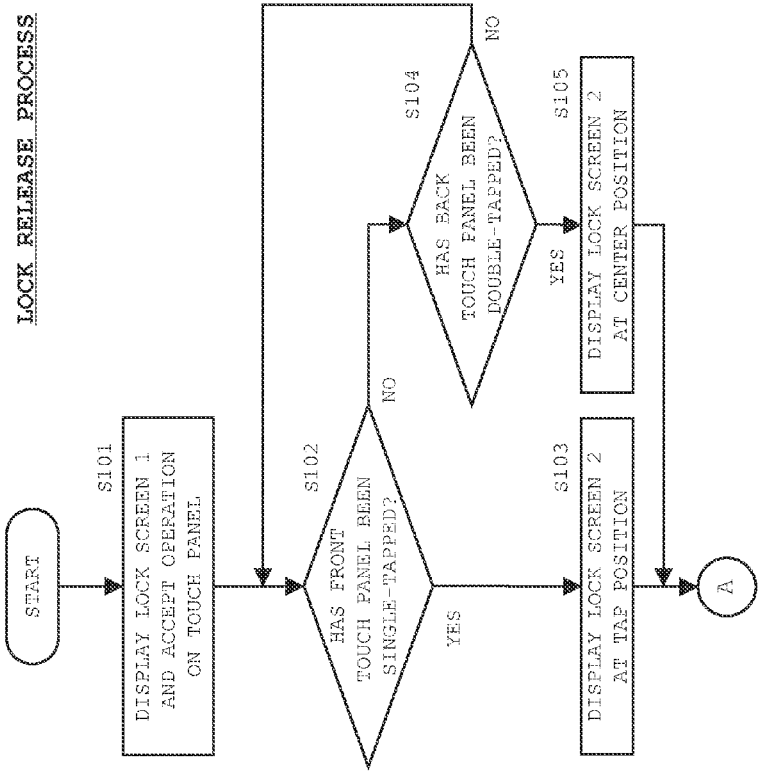
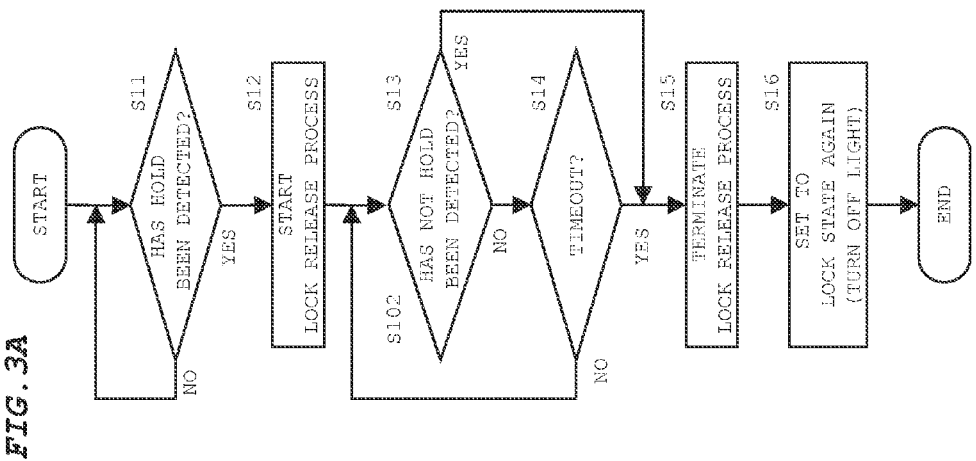

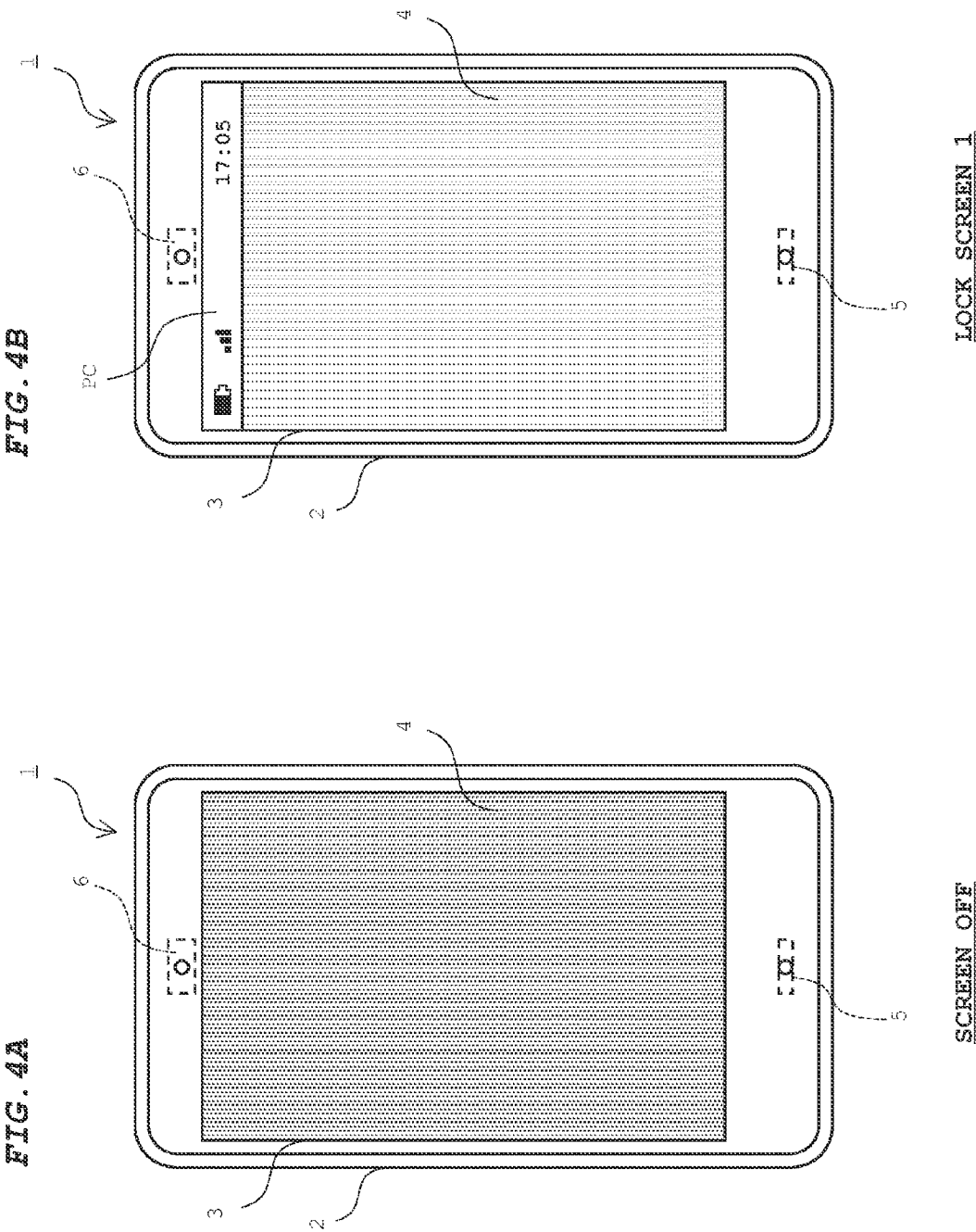

LOCK SCREEN 2

LOCK SCREEN 2

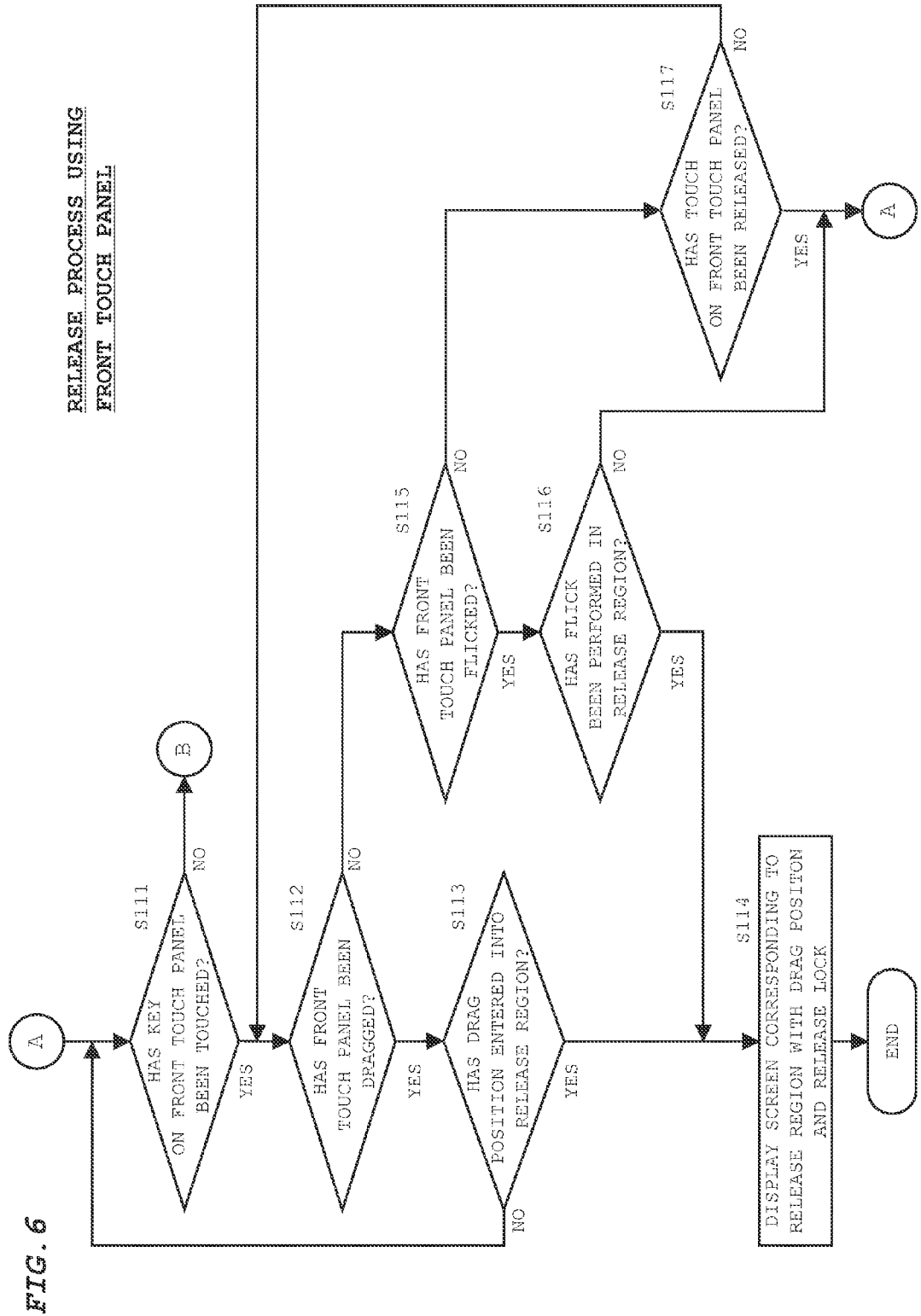

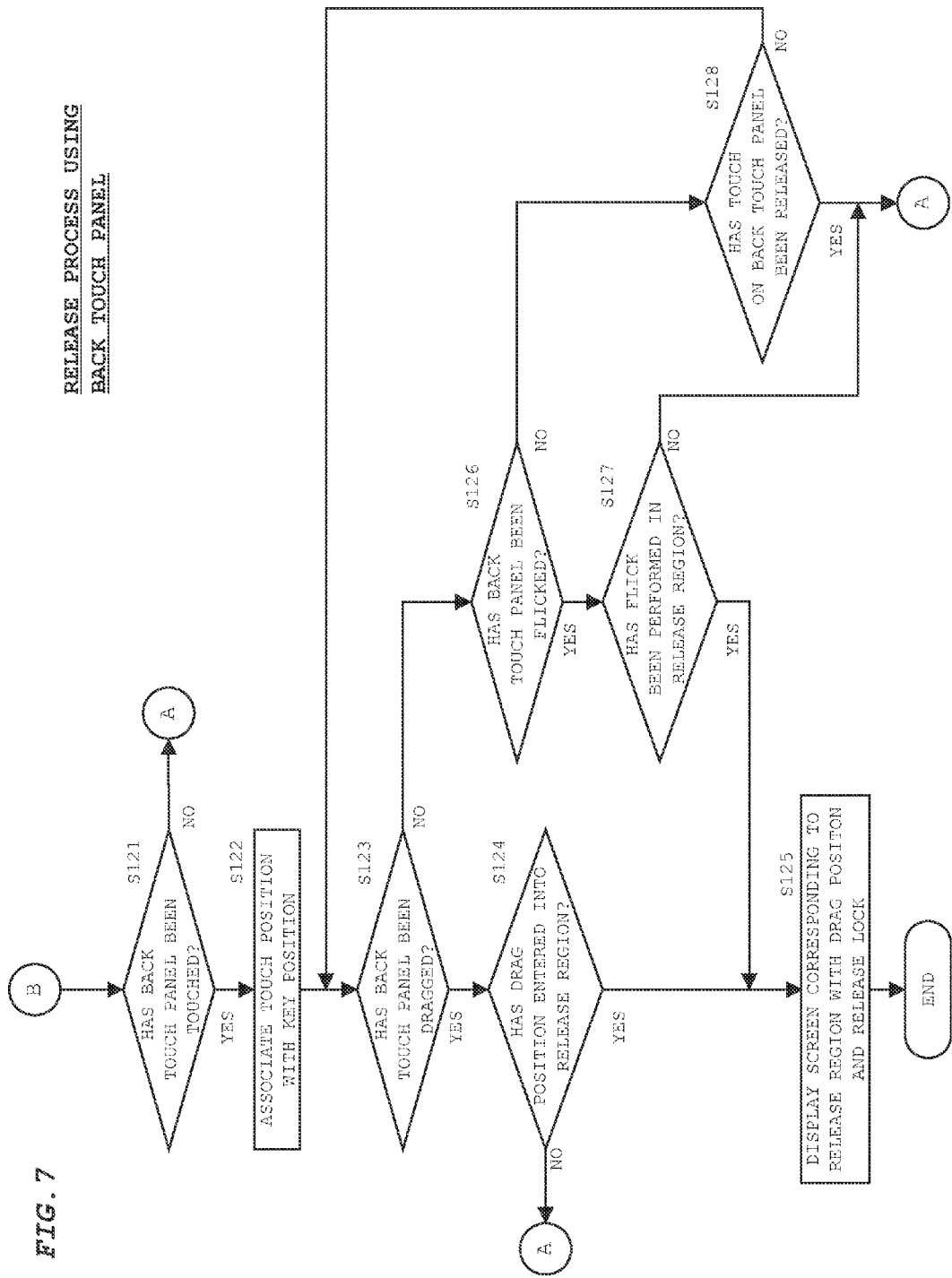

HOME SCREEN

LOCK SCREEN 2

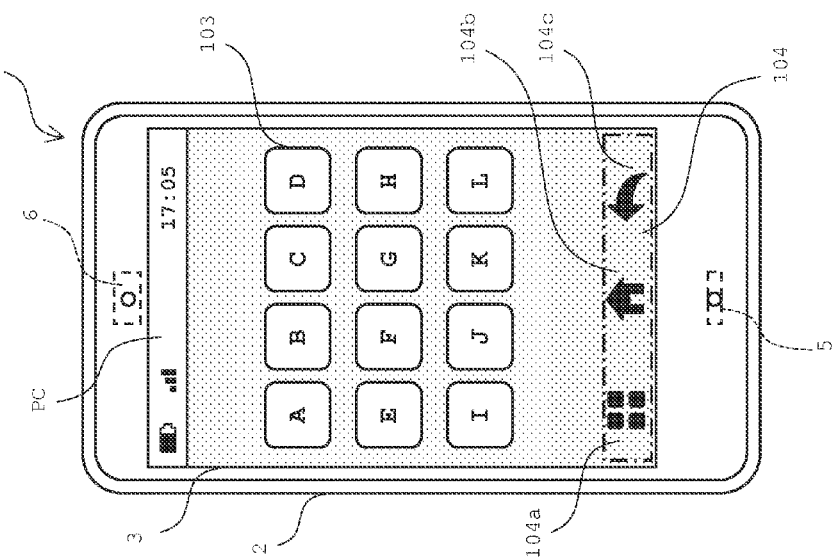
FIG.9C HOME SCREEN
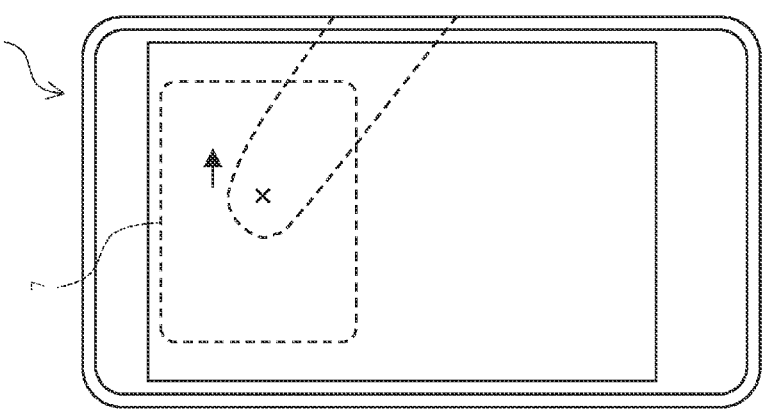
FIG.9B OPERATE BACK TOUCH PANEL
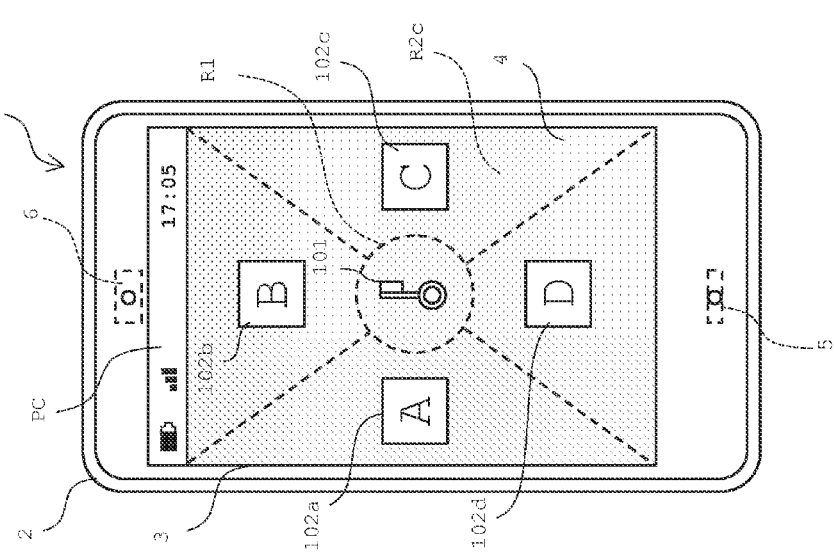
FIG.9A LOCK SCREEN 2

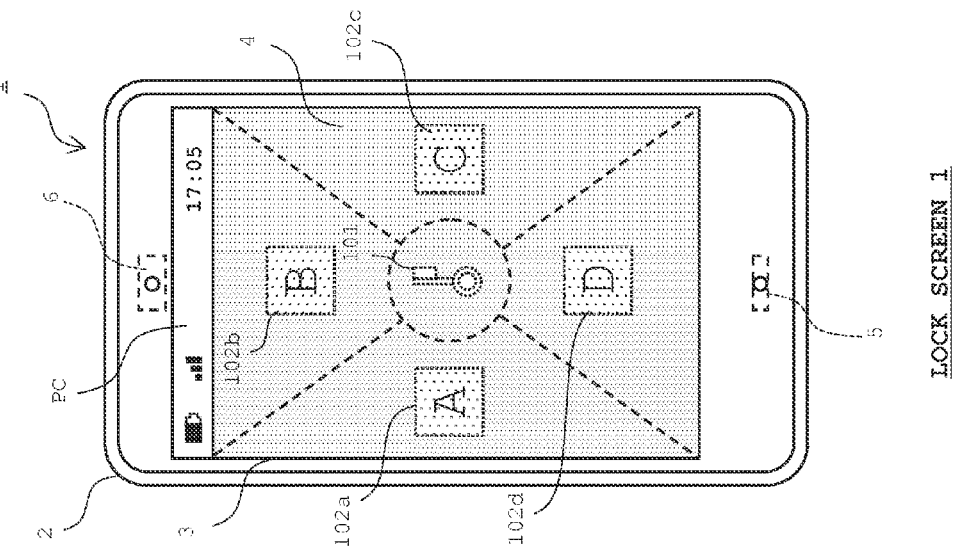
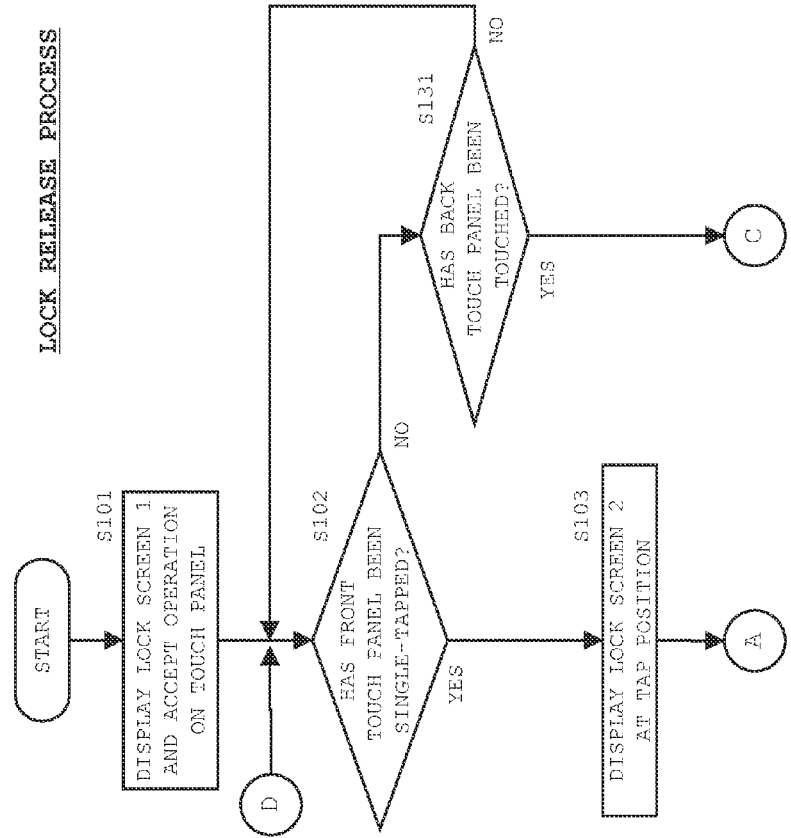

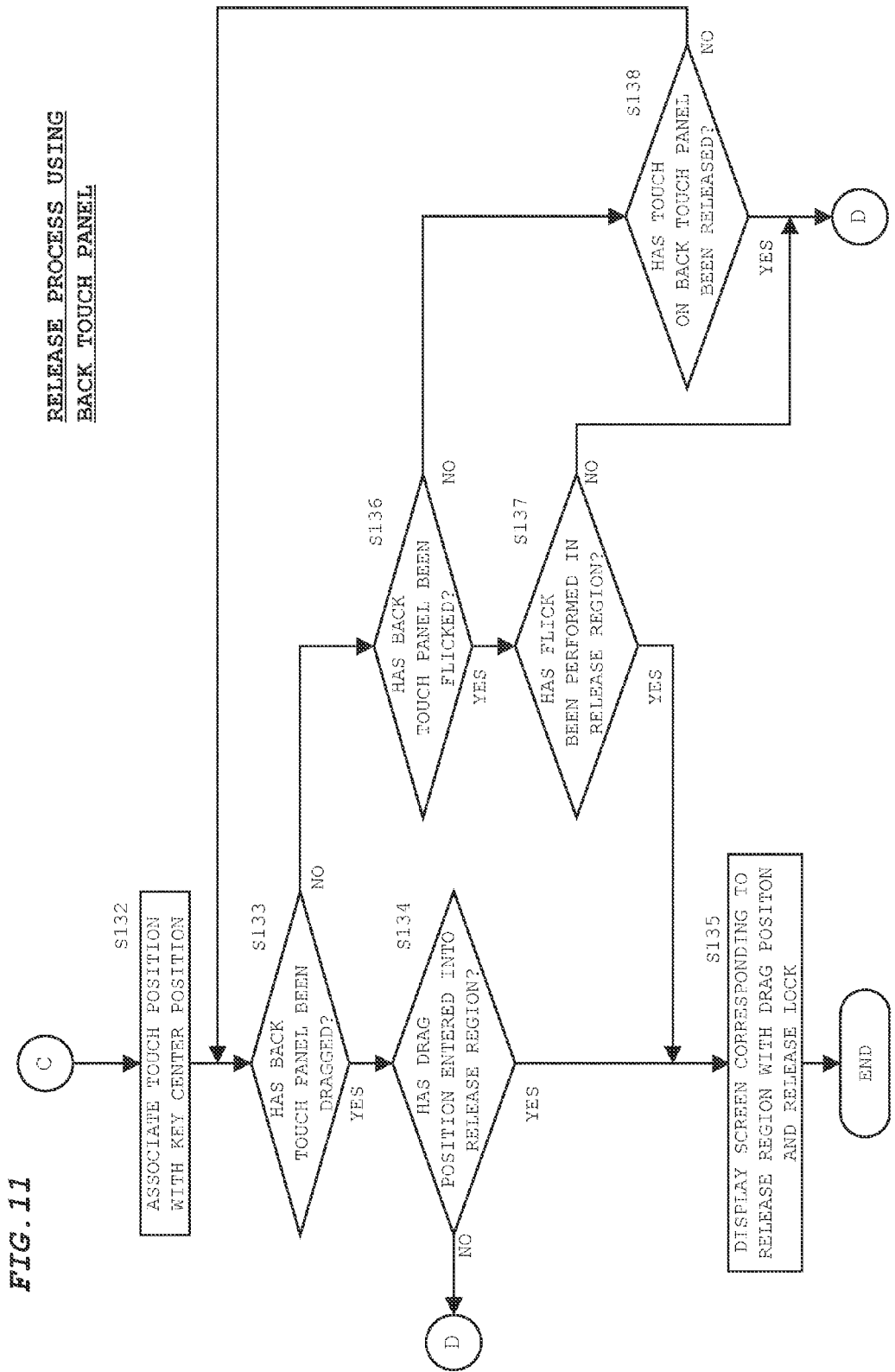

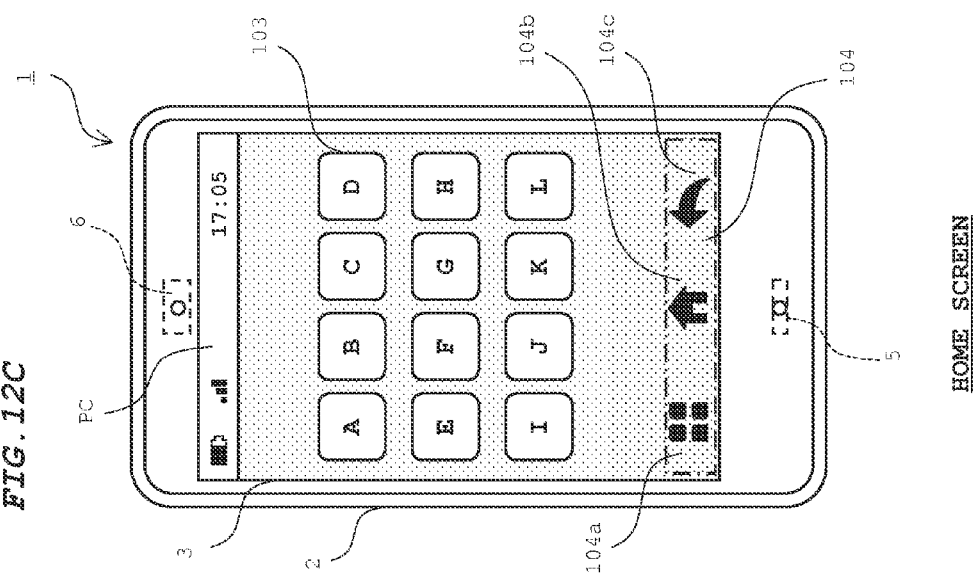
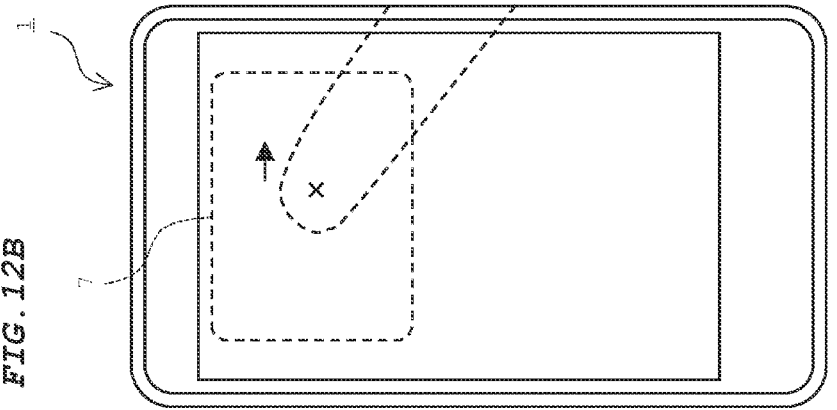
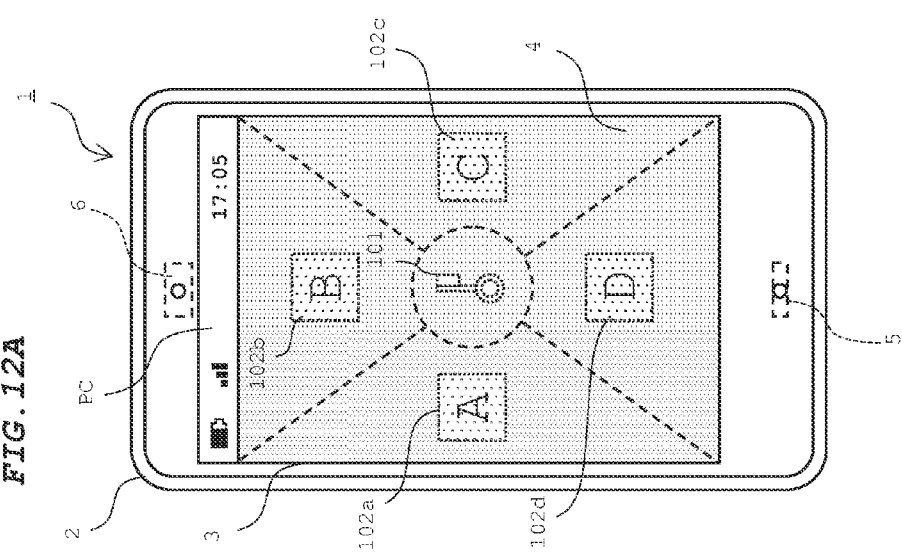

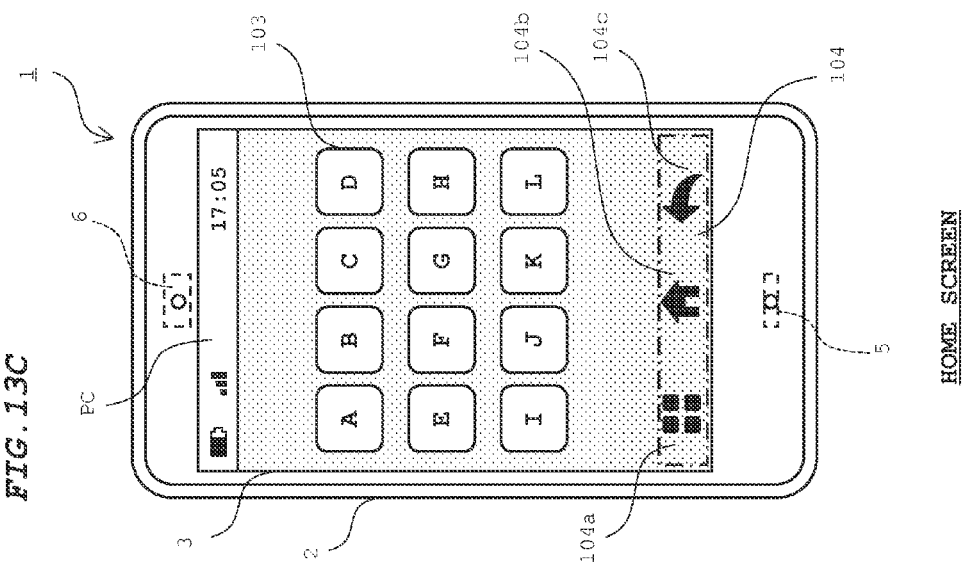
FIG. 13C  HOME SCREEN
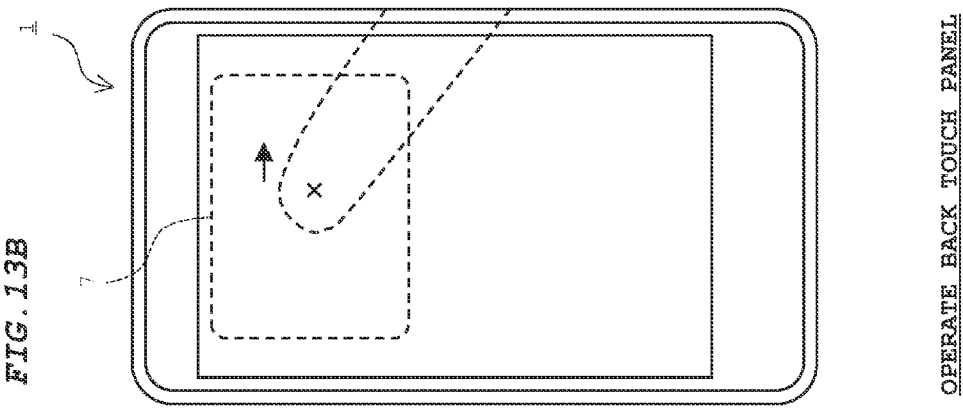
FIG. 13B  OPERATE BACK TOUCH PANEL
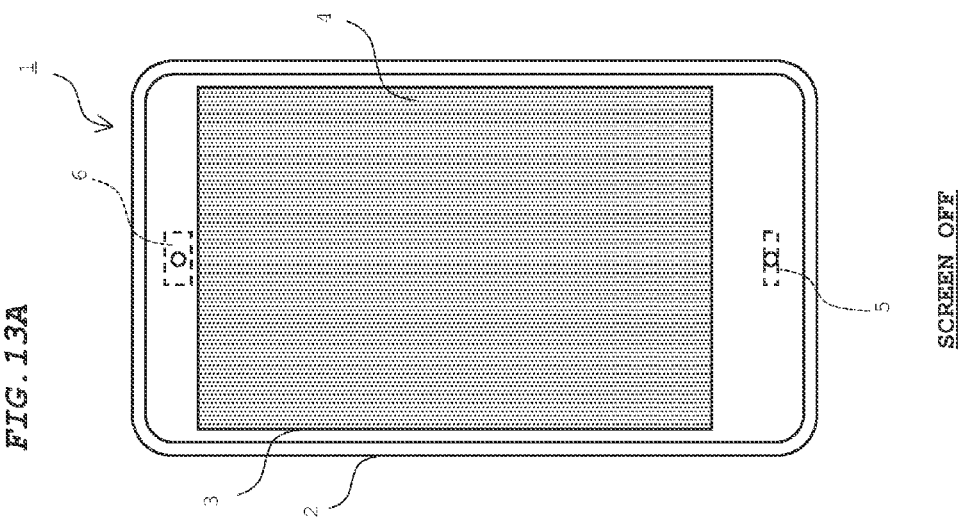
FIG. 13A  SCREEN OFF

MOBILE TERMINAL DEVICE, LOCK RELEASE METHOD, AND NON-TRANSITORY COMPUTER READABLE STORAGE MEDIUM

CROSS REFERENCE TO RELATED APPLICATION

This application is a continuation of International Application No. PCT/JP2013/084531 filed on Dec. 24, 2013, entitled "PORTABLE TERMINAL DEVICE, LOCK RELEASE METHOD AND PROGRAM", which claims priority under 35 U.S.C. Section 119 of Japanese Patent Application No. 2012-281786 filed Dec. 25, 2012, entitled "PORTABLE TERMINAL DEVICE, LOCK RELEASE METHOD, AND PROGRAM", the disclosures of the above applications are incorporated herein by reference.

FIELD

Embodiments of the disclosure relate to mobile terminal devices such as mobile phones, personal digital assistants (PDA), tablets, and e-Readers. Embodiments of the disclosure also relate to a lock release method suitably used for such mobile terminal devices, and a non-transitory computer readable storage medium suitably used for such mobile terminal devices.

BACKGROUND

Conventionally, there is known a mobile phone in which a display is disposed on the front surface of a casing. In such a mobile phone, for example, an almost rectangular display slightly smaller than the casing is disposed on the front surface of the casing with an almost rectangular outline. In addition, a touch panel is disposed on the display. The mobile phone executes various application programs (hereinafter, referred to simply as "applications") according to a user's touch operation detected by the touch panel. Since the touch panel is disposed on the display, the user feels as if operating the mobile phone by touching the display.

SUMMARY

A mobile terminal device and methods are disclosed. A display module is provided on a first surface of the casing. A first detection module is provided to cover the display module and detects a user's operation. A second detection module is provided on a second surface opposed to the first surface and detects a user's operation. A lock control module sets a lock function for preventing the user's wrong operation. The lock control module releases the setting of the lock function, if the lock function is set and if the first detection module has detected a first operation. The lock control module releases the setting of the lock function, if the lock function is set and if the second detection module has detected a second operation.

In one embodiment, a lock release method for releasing a lock function for preventing a user's wrong operation includes determining whether a first operation has been performed by a user on a display module provided on a first surface of a casing and whether a second operation has been performed by the user on a second surface opposed to the first surface, if the lock function is set. The method includes releasing the setting of the lock function according to results of the determinations.

BRIEF DESCRIPTION OF THE DRAWINGS

FIGS. 3A and 3B are flowcharts illustrating a lock releasing process according to an example 1;

FIGS. 4A and 4B are diagrams illustrating screens during a lock releasing operation according to the example 1;

FIG. 6 is a flowchart of the lock releasing process according to the example 1;

FIG. 7 is a flowchart of the lock releasing process according to the example 1;

FIG. 9A to 9C are diagrams illustrating screens during the lock releasing operation according to the example 1;

FIGS. 10A and 10B are diagrams illustrating a flowchart of a lock releasing process and a screen during a lock releasing operation according to an example 2;

FIG. 11 is a flowchart of the lock releasing process according to the example 2;

FIGS. 12A to 12C are diagrams illustrating screens during the lock releasing operation according to the example 2; and FIGS. 13A to 13C are diagrams illustrating screens during a lock releasing operation according to a modification example.

The drawings are merely intended for description and do not limit the scope of the disclosure.

DETAILED DESCRIPTION

Embodiments of the disclosure will be described below with reference to the drawings.

Figure 1:
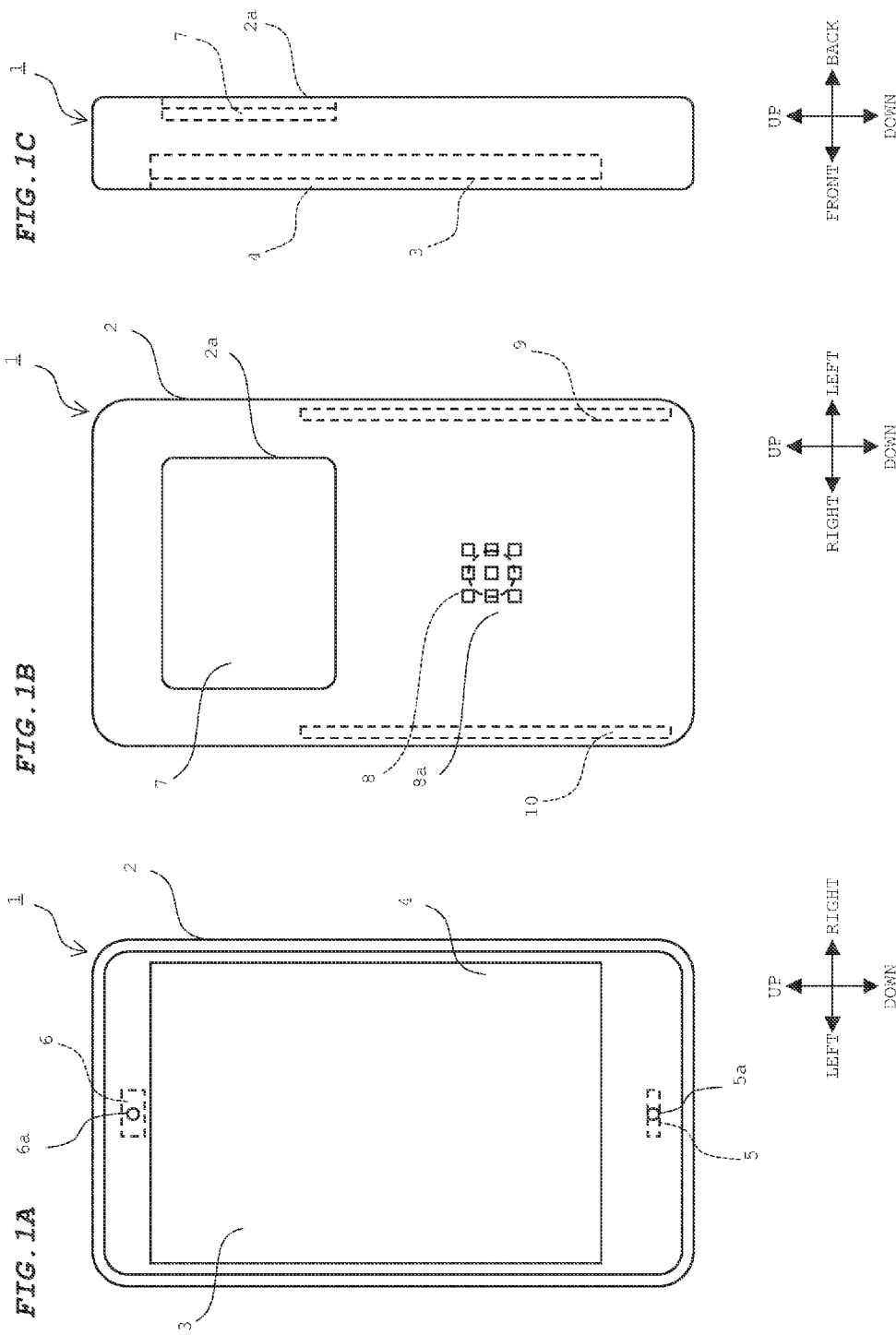
FIG. 1A to 1C are diagrams illustrating a configuration of a mobile phone in an embodiment.

FIGS. 1A, 1B, and 1C are a front view, a rear view, and a right side view of a mobile phone 1, respectively. In the following description, for the sake of convenience, directions along the long side of a housing 2 is defined as upward and downward direction, and direction along the short side of the housing 2 is defined as rightward and leftward direction as illustrated in FIGS. 1A to 1C.

As illustrated in FIGS. 1A to 1C, the mobile phone 1 may include the housing 2, a display 3, a front touch panel 4, a microphone 5, a call speaker 6, a back touch panel 7, an external speaker 8, an electric field generator 9, and an electric field detector 10.

The housing 2 may have a substantially rectangular outline as seen from the front side. The display 3 may be disposed on the front surface of the housing 2. Various images may be displayed on the display 3. The front touch panel 4 may be disposed to cover the display 3. The front touch panel 4 may be formed like a transparent sheet. The front touch panel 4 can be any one of various types of touch panels such as electrostatic capacitive type, ultrasonic type, pressure sensitive type, resistive film type, and photosensitive type.

The microphone 5 may be disposed at the lower end in the housing 2. In addition, the call speaker 6 may be disposed at the upper end in the housing 2. The microphone 5 receives sound through a microphone hole 5a in the front surface of the housing 2. The microphone 5 generates an electrical signal corresponding to the input sound. The call speaker 6 outputs sound. The output sound is emitted to the outside of the housing 2 through an output hole 6a in the front surface of the housing 2. During a call, the sound received from the communication partner's device, such as mobile phone or the like, is output from the call speaker 6, while the sound emitted by the user is input into the microphone 5. "Sound" includes various kinds of sound such as voice, ringtones, alarms, and the like.

The housing 2 may have in the back surface a concave portion 2*a* with an almost rectangular outline. The back touch panel 7 may be disposed on the concave portion 2*a*. The back touch panel 7 may be formed like a transparent sheet as the front touch panel 4 is. The back touch panel 7 may be any one of various types of touch panels such as electrostatic capacitive type, ultrasonic type, pressure sensitive type, resistive film type, and photosensitive type.

The external speaker 8 may be disposed in the housing 2. Output holes 8*a* are formed in the back surface of the housing 2 in correspondence with the external speaker 8. The sound output from the external speaker 8 is emitted to the outside through the output holes 8*a*.

The electric field generator 9 may be disposed at a position near the right side surface in the housing 2. The electric field detector 10 may be disposed at a position near the left side surface in the housing 2. The electric field generator 9 generates a feeble electric field. The electric field output from the electric field generator 9 is detected by the electric field detector 10 when the right side surface and the left side surface of the housing 2 are connected by a medium to bring the electric field into conduction. For example, when the user holds the right and left side surfaces of the housing 2 with a hand, the holding hand serves as a medium to transfer the electric field output from the electric field generator 9 to the electric field detector 10. Accordingly, the electric field detector 10 detects the electric field output from the electric field generator 9. Upon detection of the electric field, the electric field detector 10 outputs a detection signal to a control module 11 described later. While detecting the electric field, the electric field detector 10 may output the detection signal to the control module 11. When having detected no electric field any more, the electric field detector 10 may terminate the output of the detection signal.

Figure 2:
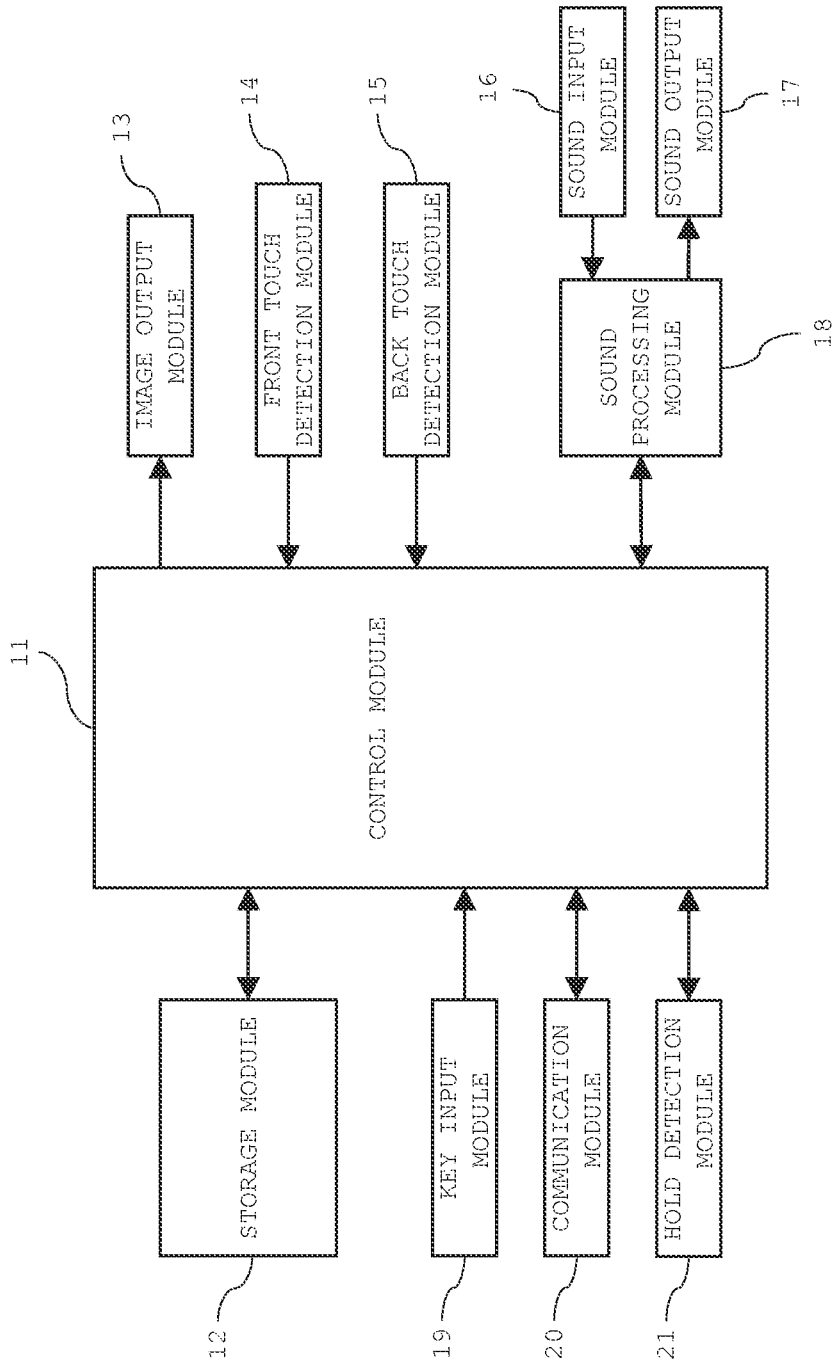
FIG. 2 is a block diagram illustrating the entire configuration of the mobile phone in an embodiment.

FIG. 2 is a block diagram illustrating the entire configuration of the mobile phone 1.

The mobile phone 1 may include a control module 11, a storage module 12, an image output module 13, a front touch detection module 14, a back touch detection module 15, a sound input module 16, a sound output module 17, a sound processing module 18, a key input module 19, a communication module 20, and a hold detection module 21.

The storage module 12 may include a ROM, a RAM, an external memory, and the like. The storage module 12 stores various programs. The programs stored in the storage module 12 include a control program for controlling the modules in the mobile phone 1, and various applications such as applications for phone, email, map, games, schedule management, and others. The programs may be stored in the storage module 12 when the mobile phone 1 is produced by the manufacturer, or may be stored in the storage module 12 by the user via a communication network or a storage medium such as a memory card or a CD-ROM.

The storage module 12 may also include a working area for storing data temporarily used or generated at execution of programs.

The control module 11 may include a CPU. The control module 11 controls the modules constituting the mobile phone 1, such as the storage module 12, the image output module 13, the front touch detection module 14, the back touch detection module 15, the sound input module 16, the sound output module 17, the sound processing module 18, the key input module 19, the communication module 20, the hold detection module 21 and others in accordance with the programs stored in the storage module 12. The control module 11 can also set and release a lock function by a program stored in the storage module 12.

The image output module 13 may include the display 3. The image output module 13 displays an image on the display 3, based on a control signal and an image signal from the control module 11. The display 3 can be any of various types of displays such as a liquid-crystal display and an organic electroluminescent (EL) display.

The front touch detection module 14 may include the front touch panel 4. The front touch detection module 14 detects by the front touch panel 4 the user's touch operation on the display 3. Specifically, when the user has touched a region on the display 3, the front touch detection module 14 detects the position touched by the user on the display 3 (hereinafter, referred to as "touch position"). The front touch detection module 14 outputs a position signal corresponding to the detected touch position to the control module 11. The position signal generated by the front touch detection module 14 includes at least information by which the touch position can be determined.

Since the front touch panel 4 is disposed on the display 3, the user feels as if operating the mobile phone 1 by touching the display 3 with a finger. Accordingly, in the following description of an embodiment, the user's operation on the front touch panel 4 may be referred to as the user's operation on the display 3. For example, the user's touch on the front touch panel 4 by a finger may be referred to as the user's touch on the display 3 by a finger.

The user can perform various touch operations by touching the display 3 with a finger. The touch operations include a tap operation, a flick operation, a slide operation, a drag operation, and the like, for example. The tap operation is an operation of touching the display 3 by a finger and then releasing the finger from the display 3 in a short time. The flick operation is an operation of touching and flipping the display 3 with a finger in an arbitrary direction. The slide operation is an operation of holding a finger in contact with the display 3 and moving the finger in an arbitrary direction. The drag operation is an operation of performing a slide operation and then releasing the finger from the display 3. The flick operation, the slide operation, and the drag operation are touch operations with movement of a touch position.

For instance, after detection of a touch position, when the front touch detection module 14 has not detected the touch position any more within a predetermined first time, the control module 11 determines that the touch operation is a tap operation. After detection of a touch position, when the touch position has been moved by a predetermined first distance or more within a predetermined second time and then the touch position has not been detected any more, the control module 11 determines that the touch operation is a flick operation. After detection of a touch position, when the touch position has been moved by a predetermined second distance or more, the control module 11 determines that the touch operation is a slide operation.

In the following description, for the sake of convenience, performing one tap operation within a predetermined period of time will be referred to as "single tap," and performing two tap operations within a predetermined period of time will be referred to as "double tap."

The back touch detection module 15 may include the back touch panel 7. The back touch detection module 15 detects by the back touch panel 7 the user's touch operation on the concave portion 2a on the back surface of the housing 2. That is, when the user touches the concave portion 2a, the back touch detection module 15 uses the back touch panel 7 to detect the touch position. The back touch detection module 15 generates a position signal according to the detected touch position and outputs the position signal to the control module 11. The position signal generated by the back touch detection module 15 includes at least information by which the touch position can be determined.

The sound input module 16 may include the microphone 5. The sound input module 16 outputs an electrical signal from the microphone 5 to the sound processing module 18.

The sound output module 17 may include the call speaker 6 and the external speaker 8. Electrical signal from the sound processing module 18 is input into the sound output module 17. The sound output module 17 outputs sound from the call speaker 6 or the external speaker 8.

The sound processing module 18 performs ND conversion or the like on the electrical signal from the sound input module 16, and outputs a converted digital sound signal to the control module 11. The sound processing module 18 performs decoding, D/A conversion, or the like on the digital sound signal from the control module 11, and outputs a converted electrical signal to the sound output module 17.

The key input module 19 may include at least one hardware key. For example, the key input module 19 includes a power key for powering on the mobile phone 1 and others. When any of the various hardware keys (not illustrated) disposed on the mobile phone 1 is pressed, the key input module 19 outputs a signal corresponding to the pressed hardware key to the control module 11.

The communication module 20 may include a circuit for converting signals, a radio wave transmission/reception antenna, and the like for calls or telecommunications. The communication module 20 converts the signals for calls or telecommunications from the control module 11 into radio signals, and transmits the radio signals via the antenna to a base station or another destination such as a communication device. The communication module 20 further converts radio signals received via the antenna into signals in a form usable by the control module 11, and outputs the converted signals to the control module 11.

The hold detection module 21 may include the electric field generator 9 and the electric field detector 10. When the electric field detector 10 detects an electric field, the hold detection module 21 outputs a detection signal to the control module 11. Upon receipt of the detection signal from the hold detection module 21, the control module 11 determines that the mobile phone 1 is held by the user.

The mobile phone 1 in an embodiment has a lock function. The lock function is intended to prevent the user's wrong operation on the front touch panel 4 or hardware keys. When a predetermined period of time has elapsed without the user's touch operation on the display 3 or operation on a hardware key, the control module 11 sets the lock function. When the lock function has been set, the screen on which an operation has been performed until then such as the home screen is closed and no operation is accepted on the display 3. Hereinafter, an embodiment will be described on the assumption that, when the lock function has been set, no operation is accepted on the display 3 until the hold detection module 21 detects that the mobile phone 1 is held.

The state where "no operation is accepted" may include the state where limited types of operations are accepted. In this case, the user can execute only the predetermined operations on the display 3. The control module 11 determines whether the user's operation detected by the front touch detection module 14 is any of the predetermined operations. When the user's operation is any of the predetermined operations, the control module 11 executes the process corresponding to the predetermined operation. When the user's operation is not any of the determined operations, the control module 11 processes the detected operation as an invalid operation. For example, when the user touches the display 3 by a finger or the like while the lock state is set, a general-purpose screen including a clock, a battery remaining power, a radio wave reception status, and the like, may be displayed on the display 3. As described above, some operations may be accepted on the display 3.

To release the lock function and use the mobile phone 1 again, the user operates specific hardware keys or the like to display a lock release screen for releasing the lock state on the display 3, and then performs a predetermined lock releasing operation on the lock release screen. However, when the user has one hand full and can use only the other hand, the user needs to hold the mobile phone 1 and perform a lock releasing operation at the same time only with the other hand. However, depending on his/her way of holding the mobile phone 1, the user may not be able to smoothly perform the operation on the lock release screen only with the other hand. In such a case, the user has to change his/her way of holding the mobile phone 1 in a desired manner to perform a lock releasing operation smoothly. This action is significantly troublesome for the user.

Accordingly, in an embodiment, a lock releasing operation is performed with the use of the back touch panel 7 on the back surface of the mobile phone 1 as well as the front touch panel 4 on the front surface of the mobile phone 1. Thus, the user can use the back touch panel 7 as appropriate to perform smoothly a lock releasing operation with one hand.

The lock releasing process is performed by the control module 11 illustrated in FIG. 2. Specifically, the control module 11 is provided with a function of releasing the lock function by a program held in the storage module 12, and the control module 11 uses the function to execute a lock releasing process. In this example, the state where the lock function is set will be referred to as lock state, and releasing the lock state means that the lock function is released.

A specific example of the lock releasing process by the control module 11 will be described below.

Example 1

In this example, when the hold detection module 21 has detected that the mobile phone 1 is held in the lock state, the control module 11 accepts operations on the front touch panel 4 and the back touch panel 7. In this state, when the front touch panel 4 or the back touch panel 7 has detected a predetermined operation, the image output module 13 displays a screen for releasing the lock state on the display 3. Then, when determining that an operation performed on the displayed screen is a predetermined operation, the control module 11 releases the lock state. The user can execute an operation on the screen for releasing the lock state with the use of the front touch panel 4 or the back touch panel 7. That is, the control module 11 determines a signal output from the front touch panel 4 or the back touch panel 7 as an operation on the screen.

FIG. 3A is a diagram of a basic process flow of lock release.

In the lock state, the control module 11 determines whether the hold detection module 21 has detected the user's holding the mobile phone 1 (S11). When the hold detection module 21 has detected the holding of the mobile phone 1 (S11: YES), the control module 11 starts the lock releasing process (S12). After that, when the hold detection module 21 has not detected holding of the mobile phone 1 any more before completion of lock releasing in the lock releasing process (S13: YES), the control module 11 terminates the lock releasing process (S15), and maintains the lock state of the mobile phone 1 (S16).

While the mobile phone 1 is held at S13 (S13: NO), when detecting a timeout at S14 (S14: YES), the control module 11 terminates the lock releasing process (S15) and sets the mobile phone 1 to the lock state again (S16). A timer for detecting a timeout at S14 is started upon detection of the holding of the mobile phone 1. After starting of the timer, when any touch operation has been detected on the front touch panel 4 or the back touch panel 7, the timer is reset to restart time measurement.

FIG. 3B is a flowchart of the lock releasing process started at S12 described in FIG. 3A.

At S11 of FIG. 3A, when the hold detection module 21 has detected the holding of the mobile phone 1, the control module 11 accepts operations on the front touch panel 4 and the back touch panel 7, and controls the image output module 13 to display a lock screen 1 on the display 3 (S101).

FIG. 4A is a diagram illustrating an example of a screen displayed on the display 3 before start of the lock releasing process, and FIG. 4B is a diagram illustrating the display 3 on which the lock screen 1 is displayed at S101 of FIG. 3B.

As illustrated in FIG. 4A, in the lock state, driving of the image output module 13 is cancelled until the mobile phone 1 is held by the user. Accordingly, the screen is in a closed state on the display 3. The state where the screen is closed includes the state where no image is displayed on the display 3 and the state where the backlight of the display 3 is off, and the like. In this state, when the mobile phone 1 is held, the lock screen 1 is displayed on the display 3 as illustrated in FIG. 4B. As illustrated in FIG. 4B, the lock screen 1 includes a pictogram region PC indicative of the battery remaining power, the radio field intensity, and the present time at the upper end part, and the other region slightly brighter than that in FIG. 4A.

Returning to FIG. 3B, after display of the lock screen 1 on the display 3, the control module 11 determines whether a single-tap operation has been performed on the front touch panel 4 (S102) or a double-tap operation has been performed on the back touch panel 7 (S104). At S104, the control module 11 determines that a double-tap operation has been performed when two tap operations (original double-tap operation) have been detected within a predetermined period of time or when three or more tap operations have been detected within a predetermined period of time.

When the user has performed a single-tap operation on the front touch panel 4 (S102: YES), the control module 11 displays a lock screen 2 on the display 3 at the position of the signal tap (S103). When the user has performed a double-tap operation on the back touch panel 7 (S104: YES), the control module 11 displays the lock screen 2 on the display 3 at the center position (S105).

Figure 5A:
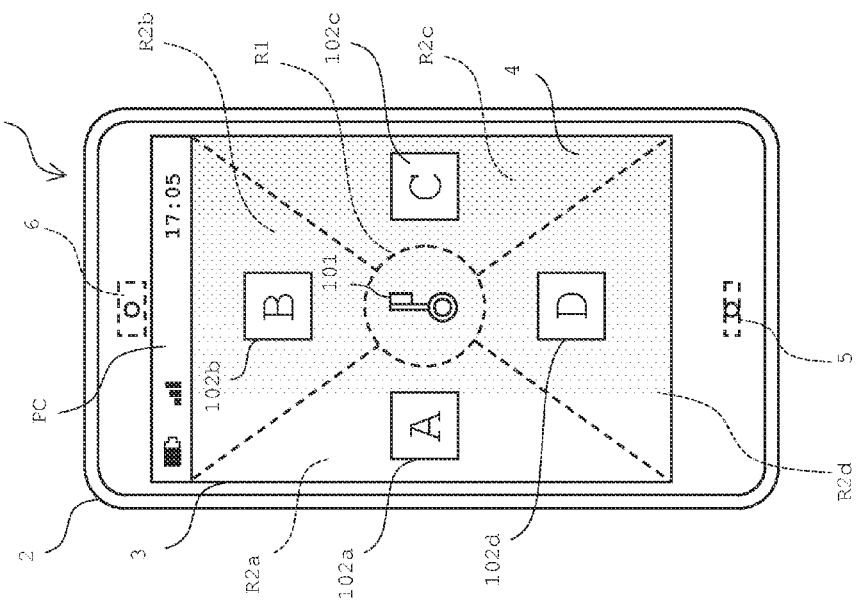
FIGS. 5A and 5B are diagrams illustrating screens during the lock releasing operation according to the example 1.
Figure 5B:
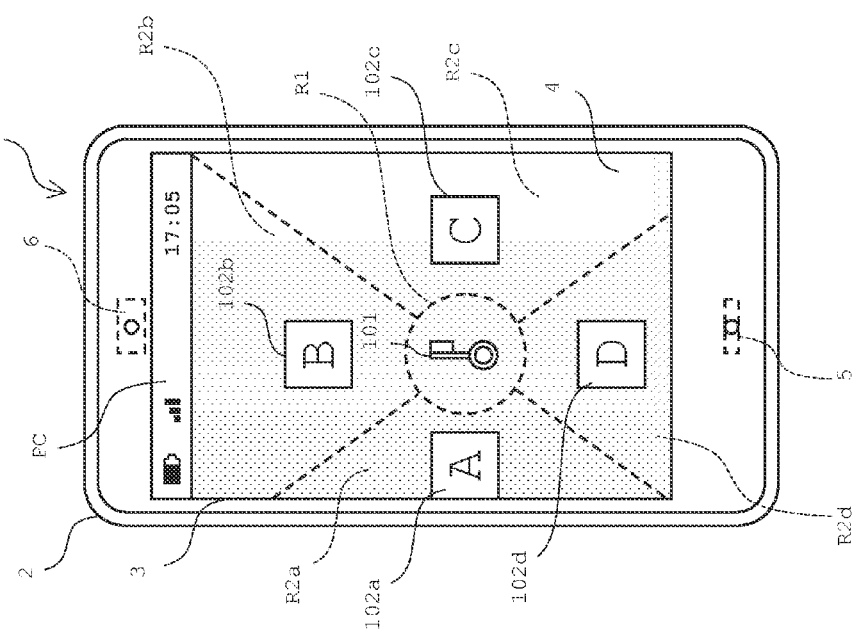

FIGS. 5A and 5B are diagrams illustrating a configuration of the lock screen 2. FIG. 5A illustrates an example of the lock screen 2 displayed on the display 3 when a single-tap operation has been performed on the front touch panel 4, and FIG. 5B illustrates an example of the lock screen 2 displayed on the display 3 when a double-tap operation has been performed on the back touch panel 7.

As illustrated in FIGS. 5A and 5B, the lock screen 2 has a key-shaped object for use in lock release (hereinafter, referred to as "key object") 101 and objects for determining a screen to be displayed after lock release (hereinafter, referred to as "screen objects") 102a to 102d. The two screen objects 102a and 102c are arranged at the right and left sides of the key object 101, and the two screen objects 102b and 102d are arranged the upper and lower sides of the key object 101.

The screen objects 102a to 102d are associated with functions to be started after lock release. For example, the screen objects 102a to 102d are associated with functions for phone, email, camera, internet, and the like. At the time of lock release, when any one of the screen objects 102a to 102d is selected, the function associated with the screen object is started and a screen to be displayed at start of the function is displayed on the display 3, as described later.

The user can select as appropriate the functions to be associated with the screen objects 102a to 102d. In this example, the screen objects 102a to 102d are associated with the functions for phone, email, home (home screen), and camera, respectively, for instance.

The lock screen 2 has a circle region (hereinafter, referred to as "invalid region") R1 with a predetermined diameter around the key object 101 as the center. The region outside the invalid region R1 is divided into four regions (hereinafter, referred to as "release regions") R2a to R2d. The release regions R2a to R2d include the screen objects 102a to 102d, respectively. As illustrated in FIG. 5B, the release regions R2a to R2d are sectioned from each other by section lines linking the vertexes of the rectangular region. The relationship between the invalid region R1 and the section lines remains unchanged even when the key object 101 is set at any position on the display 3.

FIGS. 5A and 5B provide dotted lines indicative of the outer edge of the invalid region R1 and dotted lines indicative of boundaries between the release regions R2a to R2d for the sake of convenience. In actuality, however, these dotted lines are not displayed on the lock screen 2.

In the state where the lock screen 1 illustrated in FIG. 4B is displayed, when the user has performed a single-tap operation on the front touch panel 4 (the display 3), the lock screen 2 is displayed such that the key object 101 is placed at the position of the single-tap as illustrated in FIG. 5A, for example. In the example of FIG. 5A, a single-tap has been performed at a position shifted from the center of the display 3 in the diagonally downward and leftward direction, and the key object 101 is located at that position. That is, the control module 11 determines whether the user's operation is a single-tap according to the signal detected by the front touch panel 4. When determining that the user's operation is a single-tap, the control module 11 produces the lock screen 2 where the key object 101 is arranged at the position of the single-tap. The control module 11 displays the produced lock screen 2 on the display 3 via the image output module 13.

In the state where the lock screen 1 illustrated in FIG. 4B is displayed, when the user has performed a double-tap operation on the back touch panel 7, the lock screen 2 is configured such that the key object 101 is positioned at the center portion of the display region of the lock screen 2 as illustrated in FIG. 5B. That is, the control module 11 determines whether the user's operation is a double-tap according to the signal detected by the back touch panel 7. When determining that the user's operation is a double-tap, the control module 11 produces the lock screen 2 where the key object 101 is located at the center position. The control module 11 displays the produced lock screen 2 on the display 3 via the image output module 13.

When the user has performed a lock releasing operation on the thus displayed lock screen 2, the lock state is released. That is, the user can release the lock state by performing an operation on the front touch panel 4 or the back touch panel 7 to enter the key object 101 into any of the release regions 102a to 102d.

The release operation on the front touch panel 4 is performed as described below.

That is, the user touches the key object 101 and then performs a drag operation on the key object 101 until the key object 101 enters into any one of the release regions R2a to R2d. Otherwise, the user touches the key object 101 and then performs a flick operation on the key object 101 until the key object 101 enters into any one of the release regions R2a to R2d. When each of these operations has been properly performed, the lock state is released.

In the case of releasing by a flick operation, when the distance at which the finger is continuously in touch with the front touch panel 4 during the flick operation (hereinafter, referred to as "flick distance") has exceeded a predetermined threshold, for example, the control module 11 determines that the key object 101 has come out of the invalid region R1. When the flick distance has not exceeded the threshold, the control module 11 does not determine that the key object 101 has come out of the invalid region R1 but invalidates the flick operation. When the flick distance has exceeded the threshold, the control module 11 validates the flick operation and determines that the key object 101 has entered into one of the release regions R2a to R2d along the direction of the flick operation. That is, the control module 11 calculates the flick distance according to output from the front touch panel 4. Then, the control module 11 compares the calculated flick distance to a predetermined threshold. When the flick distance is equal to or shorter than the threshold, the control module 11 invalidates the user's touch operation. When the flick distance has exceeded the predetermined threshold, the control module 11 determines that the user's touch operation is valid. When determining that the touch operation is valid, the control module 11 detects the movement direction of the touch position. The control module 11 determines which of the release regions R2a to R2d to be positioned in an extended line along the movement direction. After determining the release region, the control module 11 releases the lock function and executes the application corresponding to the determined release region. The control module 11 may detect the movement direction using coordinates of the start position of the touch operation and coordinates of the end position of the touch operation. When determining the flick operation, the control module 11 may calculate the movement amount of the key object 101 and then calculate coordinates of the arrival point of the key object 101. In this case, the control module 11 may determine whether the coordinates of the arrival point fall within the invalid region R1 or any one of the release regions. When the coordinates of the arrival point fall within the invalid region R1, the control module 11 may invalidate the flick operation. When the coordinates fall within any one of the release regions, the control module 11 may release the lock state. After releasing the lock state, the control module 11 may execute the application associated with the release region containing the coordinates of the arrival point.

In the case of releasing by a drag operation, when the end position of the drag operation falls within the invalid region R1, the control module 11 invalidates the drag operation. When the end position of the drag operation has come out of the invalid region R1 and falls within any one of the release regions R2a to R2d, the control module 11 validates the drag operation and determines that the key object 101 has moved into the release region containing the end position of the drag operation. That is, when determining that the user's touch operation is a drag operation, the control module 11 determines the coordinates of the end position of the drag operation according to output from the front touch panel 4. The control module 11 determines whether the coordinates of the end position fall within any one of the release regions or the invalid region R1. When determining that the coordinates of the end position fall within the invalid region R1, the control module 11 invalidates the touch operation performed by the user. When the coordinates of the end position fall within any one of the release regions, the control module 11 releases the lock state. After releasing the lock state, the control module 11 executes the application associated with the release region containing the coordinates of the end position.

For the release operation on the front touch panel 4, the key object 101 needs to be first touched. That is, when a drag operation or a flick operation has been performed at a position without the key object 101, these operations are handled as invalid operations for lock release.

The release operation on the back touch panel 7 is performed as described below.

The user touches an arbitrary position on the back touch panel 7 and performs a drag operation or a flick operation in a desired direction. In this case, the first touch position on the back touch panel 7 is associated with the position of the key object 101. After that, any drag operation and flick operation performed on the back touch panel 7 are accepted as drag operation and flick operation performed on the key object 101. When the key object 101 has entered into any one of the release regions R2a to R2d by the thus accepted drag operation and flick operation, the lock state is released. The determination on whether the key object 101 has entered into any one of the release regions R2a to R2d may be performed in the same manner as the determination on an operation on the front touch panel 4. For example, the control module 11 associates coordinates of the position on the back touch panel 7 touched by the user with coordinates of the position where the key object 101 is displayed, so that a drag operation and a flick operation performed on the coordinates of the position on the back touch panel 7 can be handled as a drag operation and a flick operation performed on the coordinates of the position where the key object 101 is displayed. By associating the coordinates of the positions with each other, when a flick operation has been performed on the back touch panel 7, the control module 11 acquires coordinates of the position where the touch operation has been started on the back touch panel 7 and coordinates of the position where the touch operation has been ended on the back touch panel 7. Then, the control module 11 calculates a flick distance from the coordinates of the two positions. When the calculated flick distance is equal to or shorter than a predetermined threshold, the control module 11 determines that the key object 101 falls within the invalid region R1. When the calculated flick distance is longer than the predetermined threshold, the control module 11 determines the movement direction from the coordinates of the two positions. When determining the movement direction, the control module 11 uses the coordinates of the position of the key object 101 and the movement direction to determines which of the release regions R2a to R2d is located in an extended line of the movement direction. After determining the release region, the control module 11 releases the lock function and executes the application associated with the determined release region. When a flick operation on the back touch panel 7 has been detected, the control module 11 may calculate the movement amount of the key object 101 based on information included in the detected flick operation, and calculate the coordinates of the arrival point of the key object 101. In this case, the control module 11 may determine whether the coordinates of the arrival point falls within the invalid region R1 or any one of the release regions. When the coordinates of the arrival point falls within the invalid region R1, the control module 11 may invalidate the flick operation. When the coordinates of the arrival point falls within any one of the release regions, the control module 11 may release the lock state. After releasing the lock state, the control module 11 may execute the application associated with the release region containing the coordinates of the arrival point.

As described above, when the lock state is released, the function of the screen object included in the release region into which the key object 101 has entered is started, and the screen to be first displayed at the start of the function is displayed on the display 3.

FIG. 6 is a flowchart of a releasing process using the front touch panel 4.

In the state where the lock screen 2 illustrated in FIG. 5A or 5B is displayed, when the user has touched the position corresponding to the key object 101 on the front touch panel 4 (S111: YES), the control module 11 determines whether a drag operation has been performed on the front touch panel 4 (S112).

When a drag operation has been performed (S112: YES), the control module 11 determines whether the end point of the drag operation has entered into any one of the release regions R2a to R2d (S113). When the end point of the drag operation has not entered into any one of the release regions R2a to R2d, that is, when the end point of the drag operation falls within the invalid region R1 (S113: NO), the control module 11 invalidates the drag operation and returns the process to S111. In contrast, when the end point of the drag operation has entered into any one of the release regions R2a to R2d (S113: YES), the control module 11 starts the function corresponding to the screen object included in the release region containing the end point of the drag operation, and displays the screen to be first displayed at start of the function on the display 3 (S114).

When the determination result at S112 is NO, the control module 11 determines whether a flick operation has been performed on the front touch panel 4 (S115).

When a flick operation has been performed (S115: YES), the control module 11 determines whether the key object 101 has entered into any one of the release regions R2a to R2d by the flick operation as described above (S116). When the key object 101 has not entered into any one of the release regions R2a to R2d by the flick operation, that is, when the key object 101 has not come out of the invalid region R1 (S116: NO), the control module 11 invalidates the flick operation and returns the process to S111. In contrast, when determining that the key object 101 has entered into any one of the release regions R2a to R2d by the flick operation (S116: YES), the control module 11 starts the function corresponding to the screen object included in the release region into which the key object 101 has entered, and displays the screen to be first displayed at start of the function on the display 3 (S114).

When the determination result at S112 is NO and the determination result at S115 is NO, the control module 11 determines whether the touch on the front touch panel 4 has been released (S117). When the touch on the front touch panel 4 has been released (S117: YES), the control module 11 returns the process to S111 to wait until the front touch panel 4 is touched again. When the touch on the front touch panel 4 has not been released (S117: NO), the control module 11 returns the process to S112 to wait until a drag operation or a flick operation is performed by the user.

FIG. 7 is a flowchart of a releasing process using the back touch panel 7.

In the state where the lock screen 2 illustrated in FIG. 5A or 5B is displayed, when the user has touched an arbitrary position on the back touch panel 7 (S121: YES), the control module 11 associates the touch position with the position of the key object 101 on the lock screen 2, and then acquires any subsequent drag operation and flick operation on the back touch panel 7 as a drag operation and a flick operation on the key object 101 (S122).

After that, the control module 11 determines whether a drag operation has been performed on the back touch panel 7 (S123). When a drag operation has been performed (S123: YES), the control module 11 determines whether the movement end position of the key object 101 moved by the drag operation has entered into any one of the release regions R2a to R2d (S124).

When the movement end position of the key object 101 moved by the drag operation has not entered into any one of the release regions R2a to R2d, that is, when the movement end position of the key object 101 falls within the invalid region R1 (S124: NO), the control module 11 invalidates the drag operation and returns the process to S111. In contrast, when the movement end position of the key object 101 moved by the drag operation has entered into any one of the release regions R2a to R2d (S124: YES), the control module 11 starts the function corresponding to the screen object included in the release region containing the movement end position of the key object 101 and displays the screen to be first displayed at start of the function on the display 3 (S125).

When the determination result at S123 is NO, the control module 11 determines whether a flick operation has been performed on the back touch panel 7 (S126). When a flick operation has been performed (S126: YES), the control module 11 determines whether the key object 101 has come out of the invalid region R1 based on the flick distance of the flick operation, and then determines the movement direction of the key object 101 according to the direction of the flick operation. Then, the control module 11 determines whether the key object 101 has entered into any one of the release regions R2a to R2d based on the results of the determinations (S127).

When determining that the key object 101 has not entered into any one of the release regions R2a to R2d by the flick operation, that is, when determining that the key object 101 has not come out of the invalid region R1 (S127: NO), the control module 11 invalidates the flick operation and returns the process to S111. In contrast, when determining that the key object 101 has entered into any one of the release regions R2a to R2d by the flick operation (S127: YES), the control module 11 starts the function corresponding to the screen object included in the release region into which the key object 101 has entered and displays the screen to be first displayed at start of the function on the display 3 (S125).

When the determination result at S123 is NO and the determination result at S126 is NO, the control module 11 determines whether the touch on the back touch panel 7 has been released (S128). When the touch on the back touch panel 7 has been released (S128: YES), the control module 11 returns the process to S111 to wait until the front touch panel 4 or the back touch panel 7 is touched again. When the touch on the back touch panel 7 has not been released (S128: NO), the control module 11 returns the process to S123 to wait until a drag operation or a flick operation is performed by the user on the back touch panel 7.

Figure 8B:
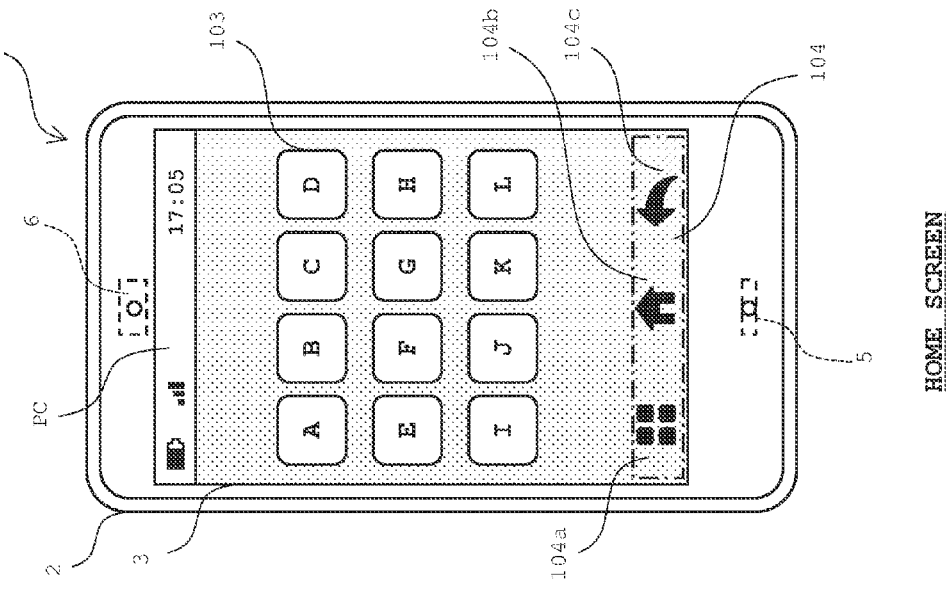
FIGS. 8A and 8B are diagrams illustrating screens during the lock releasing operation according to the example 1.
Figure 8A:
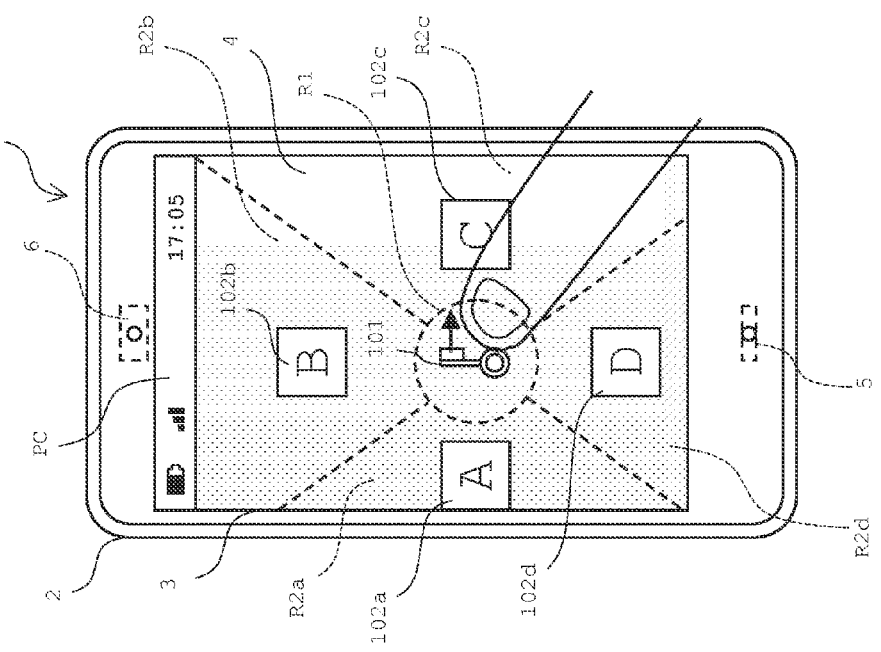

FIGS. 8A and 8B are diagrams illustrating screen transitions when a release operation has been performed on the front touch panel 4 in the state where the lock screen 2 is displayed.

In the state where the lock screen 2 is displayed on the display 3 as illustrated in FIG. 8A, when the user has touched the key object 101 on the front touch panel 4 and performed a drag operation until the finger has entered into the release region R2c, the control module 11 releases the lock state by performing S111 to S114 described in FIG. 6. In this case, since the end position of the drag operation falls within the release region R2c, the control module 11 displays on the display 3 the home screen corresponding to the screen object 102c included in the release region R2c as illustrated in FIG. 8B.

The home screen includes icons 103 corresponding to various applications. When a tap operation has been performed by the user on any one of the icons 103, the application corresponding to the icon 103 is started. The home screen also includes an operation key group 104. The operation key group 104 includes a set key 104a, a home key 104b, and a back key 104c. The set key 104a is basically intended to display a set screen for making various settings on the display 3. The home key 104b is basically intended to shift from a currently displayed screen to the home screen on the display 3. The back key 104c is basically intended to return from a currently executed process to the previous process.

FIGS. 9A to 9C are diagrams illustrating screen transitions when a release operation has been performed on the back touch panel 7 in the state where the lock screen 2 is displayed.

In the state where the lock screen 2 is displayed on the display 3 as illustrated in FIG. 9A, when the user has touched the back touch panel 7 and then performed a drag operation until the key object 101 has entered into the release region R2c as illustrated in FIG. 9B, the control module 11 releases the lock state by performing S111 to S125 described in FIG. 7. In this case, the movement end position of the key object 101 moved by the drag operation falls within the release region R2c, and the control module 11 displays on the display 3 the home screen corresponding to the screen object 102c included in the release region R2c as illustrated in FIG. 9C.

FIGS. 8A, 8B, and 9A to 9C illustrate the screen transitions when the key object 101 has been moved to the release region R2c by the drag operation. The same screen transitions occur when the key object 101 has been moved to the release region R2c by a flick operation. In addition, also when the key object 101 has been moved to the release region R2a, R2b, or R2d by a drag operation or a flick operation, the lock state is released and the screen of the function corresponding to the release region containing the movement end position of the key object 101 is displayed. For example, when the key object 101 has been moved to the release region R2a, a screen containing push buttons as an initial screen of the phone function is displayed. When the key object 101 has been moved to the release region R2b, an incoming email history list screen as an initial screen of the email function is displayed. When the key object 101 has been moved to the release region R2d, an imaging screen as a screen of the camera function is displayed.

According to this example, the lock state can be released by performing an operation on the back touch panel 7 as well as an operation on the front touch panel 4. The user is thus allowed to perform a release operation using either the front touch panel 4 or the back touch panel 7 suited for his/her way of holding the mobile phone 1. Therefore, the user can perform smoothly an operation for lock release regardless of his/her way of holding the mobile phone 1.

According to this example, the lock state can be released by the simple operation of moving the key object 101 into any one of the release regions R2a to R2d. In addition, the screens displayable after the release are associated with the release regions R2a to R2d, which allows the user to select the screen to be displayed after the lock release only by changing the movement direction of the key object 101.

According to this example, in the state where the lock screen 1 is displayed, when a single-tap operation has been performed on the front touch panel 4, the key object 101 is placed at the position of the single-tap. Accordingly, after performing the single tap, the user can touch the key object 101 without having to change the position of the finger, and perform smoothly a subsequent release operation.

According to this example, in the state where the lock screen 1 is displayed, when a double-tap operation has been performed on the back touch panel 7, the key object 101 is placed at the center position of the display 3. Accordingly, the key object 101 and the screen objects 102a to 102d can be arranged in a well-balanced manner on the screen.

According to this example, when the hold detection module 21 has detected that the mobile phone 1 has been held, the lock screen 1 is displayed to eliminate the need to perform a special initial operation to start lock release such as operating a button. At the time of lock release, the user can release the lock state smoothly by performing a series of operations of holding the mobile phone 1 with a hand and operating the front touch panel 4 or the back touch panel 7.

Example 2

In the example 1, in the state where the lock screen 1 is displayed, when a double-tap operation has been performed on the back touch panel 7, the lock screen 2 is displayed, and after that, when a drag operation or a flick operation has been performed on the back touch panel 7, the lock state is released. Meanwhile, in this example, in the state where the lock screen 1 is displayed, when a drag operation or a flick operation has been performed on the back touch panel 7, the lock state is released.

FIG. 10A is a flowchart of a lock releasing process in this example.

In FIG. 10A, steps S101 to S103 are the same as those in the flowchart of FIG. 3B. In this example, however, the configuration of the lock screen 1 displayed at S101 is different from that of the example 1. Specifically, in this example, a screen configured in the same manner as the lock screen 2 illustrated in FIG. 5B is displayed on the lock screen 1 as illustrated in FIG. 10B. On the lock screen 1 of FIG. 10B, the key object 101 and the screen objects 102a to 102d are displayed so as to be less clear than those on the lock screen 2 of FIG. 5B, such as that the key object 101 and the screen objects 102a to 102d are translucent.

In the state where the lock screen 1 is displayed, when the back touch panel 7 has been touched (S131: YES), the control module 11 performs the process described in FIG. 11. Specifically, the control module 11 associates the touch position with the position of the key object 101 on the lock screen 2, and then accepts a subsequent drag operation and flick operation performed on the back touch panel 7 as a drag operation and a flick operation performed on the key object 101 (S132).

After that, the control module 11 determines whether a drag operation has been performed on the back touch panel 7 (S133). When a drag operation has been performed (S133: YES), the control module 11 determines whether the movement end position of the key object 101 moved by the drag operation has entered into any one of the release regions R2a to R2d (S134).

When the movement end position of the key object 101 by the drag operation has not entered into any one of the release regions R2a to R2d, that is, when the movement end position of the key object 101 falls within the invalid region R1 (S134: NO), the control module 11 invalidates the drag operation and returns the process to S102 described in FIG. 10A. In contrast, when the movement end position of the key object 101 moved by the drag operation has entered into any one of the release regions R2a to R2d (S134: YES), the control module 11 starts the function corresponding to the screen object included in the release region containing the movement end position of the key object 101, and displays the screen to be first displayed at start of the function on the display 3 (S135).

When the determination result at S133 is NO, the control module 11 determines whether a flick operation has been performed on the back touch panel 7 (S136). When a flick operation has been performed (S136: YES), the control module 11 determines whether the key object 101 has come out of the invalid region R1 according to the flick distance of the flick operation as described above, and also determines the movement direction of the key object 101 by the direction of the flick operation. Then, the control module 11 determines whether the key object 101 has entered into any one of the release regions R2a to R2d based on results of these determinations (S137).

When not determining that the key object 101 has entered into any one of the release regions R2a to R2d by the flick operation, that is, when not determining that the key object 101 has come out of the invalid region R1 (S137: NO), the control module 11 invalidates the flick operation and returns the process to S102 described in FIG. 10A. In contrast, when determining that the key object 101 has entered into any one of the release regions R2a to R2d by the flick operation (S137: YES), the control module 11 starts the function corresponding to the screen object included in the release region into which the key object 101 has entered, and displays the screen to be first displayed at start of the function on the display 3 (S135).

When the determination result at S133 is NO and the determination result at S136 is NO, the control module 11 determines whether the touch on the back touch panel 7 has been released (S138). When the touch on the back touch panel 7 has been released (S138: YES), the control module 11 returns the process to S102 of FIG. 10A to wait until the front touch panel 4 or the back touch panel 7 is touched again. When the touch on the back touch panel 7 has not been released (S138: NO), the control module 11 returns the process to S133 to wait until a drag operation or a flick operation is performed by the user on the back touch panel 7.

FIGS. 12A to 12C are diagrams illustrating screen transitions when a release operation has been performed on the back touch panel 7 in the state where the lock screen 1 is displayed.

In the state where the lock screen 1 is displayed on the display 3 as illustrated in FIG. 12A, when the user has touched the back touch panel 7 and then performed a drag operation until the key object 101 has entered into the release region R2c, the control module 11 performs the process of S132 to S135 described in FIG. 11 to release the lock state. In this case, the movement end position of the key object 101 moved by the drag operation falls within the release region R2c, and the control module 11 displays on the display 3 the home screen corresponding to the screen object 102c included in the release region R2c as illustrated in FIG. 12C.

According to this example, when the back touch panel 7 has been touched in the state where the lock screen 1 is displayed, it is possible to perform an operation for lock release without going through the lock screen 2. Accordingly, the user can release the lock state more quickly and simply than in the example 1.

In the flowchart of FIG. 10A, when the back touch panel 7 has been touched on the lock screen 1, the process is moved to the flowchart of FIG. 11. In addition to this, when the back touch panel 7 has been double-tapped, the lock screen 2 illustrated in FIG. 5B may be displayed and then the process described in FIG. 7 may be performed.

<Modification Example>

As in the foregoing, examples are described. However, this disclosure is not limited to the foregoing examples but the examples can be modified in various manners other than those described above.

For example, in the examples 1 and 2, lock release is triggered by the hold detection module 21 detecting that the mobile phone 1 has been held. Besides, an additional function may be performed to, even in the state where the hold detection module 21 has not detected that the mobile phone 1 has been held, release the lock state when a predetermined release operation has been performed on the back touch panel 7.

Specifically, in the state where the screen is closed as illustrated in FIG. 13A, when the user has touched the back touch panel 7 and then performed a drag operation or a flick operation in a desired direction, the control module 11 releases the lock state as illustrated in FIG. 12B. Then, the control module 11 displays a screen corresponding to the end position of the drag operation or the direction of the flick operation. In the example of FIG. 13B, a rightward drag operation has been performed, and therefore the home screen is displayed after lock release as illustrated in FIG. 13C.

In this modification example, in the state of FIG. 13A, the lock screen 2 or the lock screen 1 of FIG. 10B is not displayed. Thus, the user cannot understand the relationship between the direction of a drag operation or a flick operation and screens to be displayed after lock release. Therefore, in this modification example, the user needs to remember the relationship between the directions of a drag operation or a flick operation and the screens to be displayed after lock release.

In the examples 1 and 2, the lock state is released by moving the key object 101 into any one of the release regions R2a to R2d. However, the method of releasing the lock state is not limited to this but any other releasing method may be used such as moving a movable key object to the position of a fixed lock object, for example.

In the example 1, when a double-flick operation has been performed on the back touch panel 7, the key object 101 is placed at the center position of the display 3. However, the display position of the key object 101 is not limited to this.

For example, when a double-flick operation has been performed on the back touch panel 7, the key object 101 may be displayed at a position shifted slightly upward from the center position of the display 3.

In the examples 1 and 2, the four release regions R2*a* to R2*d* are arranged. However, the number of the release regions is not limited to this but a different number of release regions may be arranged. In addition, the positions and shapes of the release regions are not limited to those in the examples 1 and 2.

In the examples 1 and 2, the lock screen 1 is displayed by holding the mobile phone 1. Alternatively, the lock screen 1 may be displayed by performing a predetermined operation such as operating a hardware key or the like disposed on the mobile phone 1.

The disclosure is not limited to a mobile phone but is also applicable to various mobile terminal devices such as personal digital assistants (PDA), tablets, and electronic book terminals. One or more of the functions described in this document may be performed by an appropriately configured module, part or unit. The terms "module," "part" or "unit" as used herein, individually or collectively refer to hardware, firmware, software and any associated hardware that executes the software, or any combination of these elements for performing the associated functions described herein. Additionally, various modules, parts or units can be discrete modules, parts or units. As would be apparent to one of ordinary skill in the art, however, two or more modules, parts or units may be combined to form a single module, part or unit, respectively, that performs the associated functions according to various embodiments of the disclosure. Conversely, a single module, part or unit may be divided into two or more modules, parts or units, respectively, that perform respective associated functions according to various embodiments of the disclosure.

What is claimed is:

1. A mobile terminal device, comprising:
   a casing including a first surface and a second surface opposed to the first surface;
   a touch panel display provided on the first surface and configured to detect a first touch operation;
   a touch detector provided on the second surface and configured to detect a second touch operation for operating the touch panel display; and
   at least one processor, communicatively coupled with the touch panel display and the touch detector, and configured to
   set a lock state,
   display a release screen, for releasing the lock state by the first touch operation or the second touch operation, on the touch panel display during the lock state, and,
   in response to detection of the second touch operation on the touch detector, operate the release screen displayed on the touch panel display, and release the lock state.

2. The mobile terminal device according to claim 1, wherein the touch panel display is configured to detect a third touch operation, wherein the touch detector is configured to detect a fourth touch operation, and wherein the at least one processor, during the lock state, in response to detection of the third operation or the fourth operation, displays the release screen on the touch panel display.

3. The mobile terminal device according to claim 2, wherein the release screen comprises an object for releasing the lock state, and wherein the at least one processor, during the lock state:
   in response to detection of the first touch operation on the object displayed on the touch panel display, releases the lock state; and,
   in response to detection of the second touch operation on the object displayed on the touch panel display, releases the lock state.

4. The mobile terminal device according to claim 2, wherein the at least one processor, during the lock state:
   in response to detection of the third touch operation, displays the object on the touch panel display at a position where the third operation has been detected by the touch panel display; and,
   in response to detection of the fourth touch operation, displays the object on the touch panel display at a preset position, regardless of a position where the fourth touch operation has been detected by the touch detector.

5. The mobile terminal according to claim 4, wherein a starting point of the second touch operation is associated with a preset position, and wherein the at least one processor, in response to detection of the second touch operation by the touch detector, moves the object on the touch panel display.

6. The mobile terminal device according to claim 2, further comprising a hold detector configured to detect that the mobile terminal device has been held, wherein the at least one processor, during the lock state:
   when the hold detector has not detected that the mobile terminal device has been held, does not accept the third touch operation and the fourth touch operation; and,
   when the hold detector has detected that the mobile terminal device has been held, accepts the third touch operation and the fourth touch operation.

7. The mobile terminal device according to claim 6, wherein the at least one processor, during the lock state:
   when the hold detector has detected that the mobile terminal device has been held, displays the release screen on the touch panel display in a state that is less clear than the case where the third touch operation or the fourth touch operation has been operated; and,
   in response to detection of the fourth touch operation, releases the lock state.

8. A lock release method for releasing a lock state of a mobile terminal device that comprises a casing including a first surface and a second surface opposite to the first surface, a touch panel display provided on the first surface and configured to detect a first touch operation, a touch detector provided on the second surface and configured to detect a second touch operation for operating the touch panel display, and at least one processor communicatively coupled with the touch panel display and the touch detector, the method comprising by the at least one processor:
   setting a lock state;
   displaying a release screen, for releasing the lock state by the first touch operation or the second touch operation, on the touch panel display during the lock state; and,
   in response to detection of the second touch operation on the touch detector, operating the release screen displayed on the touch panel display, and releasing the lock state.

9. A non-transitory computer readable storage medium including computer executable instructions for operating a mobile terminal device that comprises a casing including a first surface and a second surface opposite to the first surface, a touch panel display provided on the first surface and configured to detect a first touch operation, a touch detector provided on the second surface and configured to detect a second touch operation for operating the touch panel display, and at least one processor communicatively coupled with the touch panel display and the touch detector, wherein the computer executable instructions cause the at least one processor to:
  set a lock state;
  display a release screen, for releasing the lock state by the first touch operation or the second touch operation, on the touch panel display during the lock state; and,
  in response to detection of the second touch operation on the touch detector, operate the release screen displayed on the touch panel display, and release the lock state.

* * * * *